United States Patent [19]
Rainer

[11] Patent Number: 5,294,652
[45] Date of Patent: Mar. 15, 1994

[54] PROCESS FOR RECOVERING SILVER FROM PHOTOGRAPHIC CHEMICAL EFFLUENT

[76] Inventor: Norman B. Rainer, 2008 Fondulac Rd., Richmond, Va. 23229

[21] Appl. No.: 19,287

[22] Filed: Feb. 18, 1993

Related U.S. Application Data

[63] Continuation-in-part of Ser. No. 808,884, Dec. 18, 1991, Pat. No. 5,187,200.

[51] Int. Cl.$^5$ .......................... C08L 11/00; C08J 5/20; B01D 15/00; C08C 69/26
[52] U.S. Cl. ......................................... 524/30; 521/25; 521/30; 527/312; 210/670; 210/679; 210/681; 210/683; 210/688; 210/690; 210/691; 528/341; 528/342; 106/168
[58] Field of Search .................. 524/30; 521/25, 30; 527/312; 210/670, 688, 679, 711, 681, 683, 690, 691; 528/341–342; 106/168

[56] References Cited

U.S. PATENT DOCUMENTS

| | | | |
|---|---|---|---|
| 3,580,891 | 5/1971 | Rainer | 528/355 |
| 3,715,339 | 2/1973 | Rainer | 524/30 |
| 4,287,031 | 9/1981 | Good et al. | 204/109 |
| 4,332,916 | 6/1982 | Thill | 521/25 |
| 5,002,984 | 3/1991 | Rainer | 524/30 |
| 5,096,946 | 3/1992 | Rainer | 521/30 |
| 5,162,404 | 11/1992 | Rainer | 521/25 |
| 5,169,883 | 12/1992 | Rainer | 527/312 |

*Primary Examiner*—John Kight, III
*Assistant Examiner*—P. Hampton-Hightower
*Attorney, Agent, or Firm*—Norman B. Rainer

[57] ABSTRACT

A process for absorbing silver from photographic hypo solutions involves passing the hypo solution through a bed consisting of a multitude of a sponge product confined within a vessel. The sponge product is derived from an open-celled cellulosic sponge into which there has been incorporated 30% to 80% by weight of a polymer produced by the thermal interaction of polyethyleneimine (PEI) with a polycarboxylic acid. The polymer further contains an activating multivalent cation and between 90% and 300% water. Silver is eluted from the sponge product employing aqueous solutions of a complexing agent such as an ammonium compound or a cyanide compound. Following a water wash, the bed of sponge product is ready for its next cycle of silver absorption.

8 Claims, No Drawings

PROCESS FOR RECOVERING SILVER FROM PHOTOGRAPHIC CHEMICAL EFFLUENT

RELATED APPLICATIONS

This application is a continuation-in-part of U.S. patent application Ser. No. 07/808,884, filed Dec. 18, 1991, now U.S. Pat. No. 5,187,200.

BACKGROUND OF THE INVENTION

1. Field of the Invention

This invention concerns the recovery of dissolved silver from solutions having been employed for the processing of silver-containing photosensitive materials.

2. Description of the Prior Art

Photosensitive materials such as films and papers employed for black-and-white photography generally have an emulsion layer which contains a finely divided silver halide such as the chloride or bromide. In the course of the development and fixing of the image within the emulsion layer, molecules of silver halide which are not converted to metallic silver by the developer are dissolved out of the emulsion layer by a "hypo" solution which generally employs a thiosulfate.

Following a certain amount of use, the hypo solution becomes spent, and must be discarded. Although it is desirable to recover the dissolved silver for its economic value, it is more important to recover the silver because it is highly toxic, and should not be indiscriminately dumped into a convenient sewer line. The United States Environmental Protection Agency has indicated that industrial effluents should contain less than 5 parts per million (ppm) silver, and drinking water should contain less than 0.05 ppm silver. Techniques generally employed for removing silver from spent hypo include electrodeposition, and treatment with a sacrificial metal such as steel wool. Hypo solutions emergent from an electrolytic cell which removes silver by electrodeposition upon electrodes will have silver concentrations between about 50 and 200 ppm. Hypo solutions emergent from steel wool systems will have unpredictably high levels of silver, depending upon the state of exhaustion of the steel wool, and will contain undesirably high levels of dissolved iron.

Attempts have been made to utilize ion exchange resins to remove the silver from spent hypo. Because the dissolved silver is in an anionic form such as silver thiosulfate $Ag(S_2O_3)_2^{-3}$, an anion exchange resin must be employed. However, ordinary anion exchange resins are not sufficiently selective to discriminate between the silver thiosulfate anion and unreacted thiosulfate and sulfite anions present in the hypo solution.

U.S. patent application Ser. No. 07/808,884, filed Dec. 18, 1991, now U.S. Pat. No. 5,180 concerns a specialized chelation-type ion exchange resin having the ability to selectively remove silver thiosulfate from spent hypo solutions. Although a worthwhile accomplishment, such removal of silver from hypo solutions would be even more practical if the silver could be eluted from the resin, permitting repeated recycling of the resin. Such elution and recycling is not disclosed in said Patent Application.

The usually employed procedure for eluting absorbed species from an anion exchange resin and re-using the resin involves treatment of the resin with strong solutions of anions that can replace the absorbed anion. In the case of the aforesaid chelation-type resins, especially when disposed within an open-celled sponge, treatment with strong solutions of the usual anions has bee-,i found to be poorly effective in eluting absorbed silver.

In the several aforesaid techniques for removing silver from photoprocessing effluents, the efficiency of silver removal is generally inversely dependent upon the rate of flow of the effluent. The efficiency of silver removal is also dependent upon the degree of saturation of whatever device or material is employed.

It is accordingly an object of the present invention to provide a process for removing silver from photoprocessing hypo solution.

It is a further object of this invention to provide a process as in the foregoing object employing a chelation-type ion exchange resin which removes said silver by selective absorption.

It is another object of the present invention to provide a process of the aforesaid nature wherein the silver absorbed on said resin can be eluted, and the resin can be re-used in said process.

It is a still further object of this invention to provide a process of the aforesaid nature wherein the efficiency of silver removal has reduced dependency upon the flow rate of said hypo solution and the degree of saturation of said resin with silver.

It is yet another object of the present invention to provide a process of the aforesaid nature which involves low capital investment and low operating costs.

These and other beneficial objects and advantages will be apparent from the following description.

SUMMARY OF THE INVENTION

The above and other beneficial objects and advantages are accomplished in accordance with the present invention by a process for removing silver from a photoprocessing hypo solution comprising:

a) passing said solution through a bed of open celled sponge product containing a gel form of a polymer produced by the thermal interaction of polyethyleneimine (PEI) with a polycarboxylic acid, said polymer containing chemically bonded thereto a substantially saturation amount of an activating multivalent metal cation and containing between 90% and 300% of water based upon the dry weight of the polymer, the rate of passage of said solution through said bed being between 0.05 and 2.0 bed volumes/minute (bvm), b) eluting silver from said bed by passing through said bed an aqueous solution of a complexing agent selected from the group consisting of ammonium compounds and cyanide compounds, and c) washing said bed with water, thereby removing said complexing agent and preparing said bed for re-use, beginning at step a.

Preferred multivalent cations include $Mg^{++}$, $Ca^{++}$, $Al^{+++}$, $Cu^{++}$, and $Fe^{+++}$. In a particularly preferred embodiment, the sponge product comprises between 30% and 80% of polymer based upon the "overall dry weight of said sponge product. The sponge product is preferably of cuboid configuration, having an average volumetric size less than a cubic inch.

Suitable complexing ammonium compounds include ammonium hydroxide, ammonium nitrate, ammonium acetate and other ammonium salts which ionize in water. Suitable cyanide compounds include sodium cyanide, potassium cyanide, ammonium cyanide and other compounds which provide the cyanide anion ($CN^-$) in water. Mixtures of complexing agents may be employed in the elution step.

DESCRIPTION OF THE PREFERRED EMBODIMENT

The polymer employed in the process of the present invention is preferably one produced by the insolubilization of polyethyleneimine (PEI) with a multi-functional carboxylic acid. Polyethyleneimine, a water-soluble branched chain polymer having recurring secondary amino nitrogen atoms, is commercially available in molecular weights ranging from 1200 to 60,000. Preferred polycarboxylic acids are those which additionally contain amino nitrogens, typical embodiments including iminodiacetic acid, ethylenediamine tetraacetic acid and nitrilotriacetic acid. The resultant insolubilized or cross-linked PEI preferably contains pendant carboxyl groups by virtue of the multi-functional carboxylic acid.

The polymer is produced within the sponge by initially dissolving the otherwise insoluble multi-functional carboxylic acid in an aqueous solution of PEI to produce a homogeneous precursor solution. An open-celled cellulosic sponge is impregnated with the precursor solution. The sponge is then subjected to thermal curing at temperatures in the range of 130 degrees C to 170 degrees C, preferably in an oxygen-free environment, to achieve an amide-type condensation cross-linking reaction which produces a water-insoluble gel polymer that swells in water. The extent of cross-linking of the gel polymer is controlled primarily by the ratio of PEI/polycarboxylic acid and the time and temperature of the curing treatment. The gel polymer product absorbs water in amounts generally indicative of the extent of cross-linking. For example, highly cross linked Polymers absorb less than 90% of water based upon their dry weight. Very slightly cross-linked polymers can absorb as much as 500% of water. It has been found that, for the purposes of the present invention, polymers having a water absorption capacity less than 90% lack adequate ion exchange capacity, and polymers having a water absorption capacity over 300% lack adequate cohesive strength.

The amount of water absorbable by the gel polymer is measured by blotting excess water off a mass of fully waterswollen polymer prepared in the absence of the sponge, weighing, heating to dryness, and re-weighing. The percent water absorption is expressed as the weight of water divided by the dry weight of the polymer times one hundred.

When the polycarboxylic acid is nitrilotriacetic acid (NTA), the preferred weight ratio of NTA/PEI to achieve crosslinking in the desired range is between 0.9 and 1.4.

Incorporation of the activating metal cation into the polymer may be accomplished either by inclusion of the cation within the precursor solution, or by an aftertreatment of the polymer. The metal cations become chemically bound to the polymer by formation of ionic bonds with carboxyl groups and formation of coordination bonds with amine groups. Regardless of the exact manner of chemical bonding, the polymer interacts with a stoichiometric amount of the metal ion. By this it is meant that each polymer type can reproducibly saturate with a specific quantity of metal ions. Any metal ions present beyond the stoichiometric amount are not chemically bound, and can be removed by physical methods such as extraction with water. It is to be understood however, that the manner of chemical bonding may be governed by general considerations of chemical equilibrium. Accordingly, excessive extraction of a metal-containing polymer with water may in some instances cause a slight loss of metal ions, the magnitude of the loss being dependent upon an equilibrium constant.

Polymers prepared for use in accordance with the present invention, containing stoichiometric quantities of metal cations, generally contain a weight of metal ion in the range of 2% to 20%, based upon the dry weight of the polymer. The exact weight of metal content is dependent upon the particular nature of the polymer and the valence and atomic weight of the metal ion.

For the proper treatment of photoprocessing effluent solution, a bed of the sponge product is preferably confined within a tube, column or drum structure wherein the ratio of height or long axis to diameter is between about 1.5 and 10. It has been found that greater efficiency of silver removal is achieved when the sponge product is in a compacted state within said confining structure. The extent of said compaction is such that, in the compacted state, the sponge product occupies between 40% and 80% of the volume that would be occupied by the uncompacted sponge product, corresponding to compactions of 60% and 20%, respectively. The flow of solution to the treated is preferably in the direction of the height or long axis of the confining structure, said flow traveling from an inlet port, thence through the sponge product, and thence through the exit port. The rate of flow through the bed should be in the range of 0.05 to 2.0 b.v.m.

The following examples are presented for illustrative purposes without intending to be limitative of the scope of the invention. All parts and percentages are by weight.

EXAMPLE 1

A vertical column of 4" inside diameter was filled to an uncompacted bed height of 40" with polymer-containing sponges having a 9 mm cubic configuration. The sponges are comprised of 72% by weight of a gel polymer produced by the thermal cross-linking of PEI with NTA, the water-absorption capacity of the polymer being 252%. Calcium was incorporated into the polymer by treating the sponges with lime water in the column, followed by washing with water.

A photographic hypo solution containing 977 ppm $Ag(S_2O_3)_2^{-3}$, 847 ppm of $(S_2O_3)^{-2}$ and 513 ppm $SO_3^{-2}$ was passed downwardly through the bed at a flow rate of 0.08 bed volume/minute. The treated solution emergent from the column initially contained 2.1 ppm silver, as measured by atomic absorption. In the course of passage of four bed volumes of the photographic solution through the column, the silver content of the emergent treated solution rises to 5.0 ppm. Passage of the photographic solution through the column was continued until the bed of sponges was substantially saturated, as evidenced by a silver content in the emergent solution of 952 ppm. The bed was then washed with 5 bed volumes of water, and a sample of the saturated sponge was removed from the top of the bed. The sample was found to contain 5.4% silver (dry weight basis).

In separate experiments, different aqueous eluting solutions were employed in attempts to remove the absorbed silver from the bed and enable the sponge to be re-used for silver absorption. Following each elution trial, the bed was re-saturated with silver from the photographic solution. In each trial, the effectiveness of the eluting solution was determined by measuring the percent of silver removed from the sponge. The eluting solutions tried, and results obtained are shown in Table 1 below.

TABLE 1

| Eluting Solution | % Ag Removed |
| --- | --- |
| 1.6% Sodium Thiosulfate | 12 |
| 5.0% Sodium Nitrate | 25 |
| Ammonium Hydroxide (saturated) | 78 |
| Ammonium Acetate (saturated) | 79 |
| Ammonium Nitrate (saturated) | 82 |
| 1.0% Sodium Cyanide | 93 |

As the data indicate, desorption of silver is not produced as a consequence of a simple anion exchange reaction. If such were the case, then the sodium nitrate solution should have been effective. Instead, desorption of silver appears to require the presence of a complexing moiety such as cyanide or ammonium ions. Despite the different efficiencies of the several eluting solutions, in each case the sponge, following passage of several bed volumes of wash water, was found to be capable of reabsorbing its initial saturation level of silver, and such recycling ability is achievable for at least ten cycles.

EXAMPLE 2

The polymer-containing sponge product of Example 1 containing aluminum instead of calcium was employed to form a bed of initially 40″ height in a vertical column of 4″ inside diameter. In different trials, the bed was subjected to various degrees of compaction prior to receiving the hypo solution of Example 1. The beds were subjected to vacuum deaeration to remove air trapped within and between sponges. The flow rate of the hypo solution through the bed was maintained at 0.15 bed volume/minute for each trial. The initial four bed volumes of treated solution emergent from the column were collected as a single sample for silver analysis. The results obtained are reported in Table 2 below.

TABLE 2

| % of bed compaction | Concentration of Ag in the treated solution (ppm) |
| --- | --- |
| 0 | 7.8 |
| 12 | 6.3 |
| 19 | 4.7 |
| 28 | 3.5 |
| 43 | 2.8 |

As the data of Table 2 indicate, greater compaction of the bed produces greater efficiency of silver removal. The compacted beds of sponge of this example were found capable of discharging at least 90% of the absorbed silver into a 1.0% sodium cyanide eluting solution. Following a water wash, the sponges were capable of repeated cycles.

The elution solutions may be employed at ambient room temperature or at elevated temperatures up to about 95 degrees C. The elution solutions containing silver can be passed through an electrolytic cell which removes silver, and enables the elution solution to be utilized again in subsequent elution cycles. Because the elution step requires procedures and chemicals generally unfamiliar to photoprocessing installations, it is preferable that the sponge product be packaged in returnable drums amenable to shipment by ordinary modes of transportation. In this manner of use, when the sponge in the drum is saturated with silver, it would be returned to a processing facility where elution of silver and washing would be performed, and the sponge-containing drum would be returned to the user for the next cycle of use. Such drums preferably have inlet and exit ports, thereby enabling the sponge to be utilized, eluted and washed without removal from the drum.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for removing silver from a photoprocessing hypo solution comprising:
   a) passing said solution through a bed of open celled sponge product containing a gel form of a polymer produced by the thermal interaction of polyethyleneimine (PEI) with a polycarboxylic acid, said polymer containing chemically bonded thereto a substantially saturation amount of an activating multivalent metal cation and containing between 90% and 300% of water based upon the dry weight of the polymer, the rate of passage of said solution through said bed being between 0.05 and 2.0 bed volumes/minute (bvm),
   b) eluting silver from said bed by passing through said bed an aqueous solution of a complexing agent selected from the group consisting of ammonium compounds and cyanide compounds, and
   c) washing said bed with water, thereby removing said complexing agent and preparing said bed for re-use, beginning at step a.

2. The process of claim 1 wherein said activating multivalent metal cation is selected from the group consisting of $Mg^{++}$, $Ca^{++}$, $Al^{+++}$, $Cu^{++}$ and $Fe^{+++}$.

3. The process of claim 1 wherein said sponge product is comprised of between 30% and 80% by weight of said polymer, based upon the overall dry weight of said sponge product.

4. The process of claim 1 wherein said sponge product has a cuboid configuration having a volume less than one cubic inch.

5. The process of claim 1 wherein said sponge product is confined within an elongated vessel wherein the ratio of long axis to diameter is between about 1.5 and 10.

6. The process of claim 5 wherein said hypo solution is caused to pass through said bed of sponges in the direction of the long axis of said vessel.

7. The process of claim 6 wherein the bed is compacted to a volume 20% to 60% less than the uncompacted volume.

8. The process of claim 5 wherein said vessel is provided with inlet and exit ports, and serves as a shipping container.

* * * * *